United States Patent
Jenkins et al.

(10) Patent No.: US 11,436,810 B1
(45) Date of Patent: Sep. 6, 2022

(54) SELECTIVELY PAUSING PHYSICAL MOVEMENT IN A VIRTUAL ENVIRONMENT

(71) Applicant: International Business Machines Corporation, Armonk, NY (US)

(72) Inventors: Jana H. Jenkins, Raleigh, NC (US); Vidya Nambiar, Durham, NC (US); Pratyusha Mandapati, Morrisville, NC (US); Sarbajit K. Rakshit, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/448,585

(22) Filed: Sep. 23, 2021

(51) Int. Cl.
*G06T 19/00* (2011.01)
*H04N 21/433* (2011.01)

(52) U.S. Cl.
CPC ...... *G06T 19/006* (2013.01); *G06T 2219/028* (2013.01); *H04N 21/4333* (2013.01)

(58) Field of Classification Search
None
See application file for complete search history.

(56) References Cited

U.S. PATENT DOCUMENTS

| | | |
|---|---|---|
| 2007/0165964 A1 | 7/2007 | Wolf |
| 2013/0329030 A1 | 12/2013 | Tolkowsky |
| 2017/0255258 A1 | 9/2017 | Feiner |
| 2018/0182142 A1 | 6/2018 | Lim |
| 2019/0371065 A1 | 12/2019 | Anders |
| 2020/0086795 A1 | 3/2020 | Rakshit |
| 2021/0090335 A1 | 3/2021 | Rakshit |

OTHER PUBLICATIONS

"Peripheral vision", Wikipedia, This page was last edited on Apr. 17, 2021, 5 pages, <https://en.wikipedia.org/wiki/Peripheral_vision>.
Andersen et al., "Augmented Reality Concentration Cubicle", An IP.com Prior Art Database Technical Disclosure, IP.com No. IPCOM000249206D, IP.com Electronic Publication Date: Feb. 9, 2017, Copyright: 2017 Cisco Systems, Inc., 6 pages.
Bobeshko, Anastasiia, "Object Recognition in Augumented Reality", Apr. 7, 2017, 10 pages, <https://virtualrealitypop.com/object-recognition-in-augmented-reality-8f7f1712>.
Disclosed Anonymous, "A Method to Detect & Prevent Distractions to a User Using Augmented Reality", An IP.com Prior Art Database Technical Disclosure, IP.com No. IPCOM000247421D, IP.com Electronic Publication Date: Sep. 6, 2016, 6 pages.

(Continued)

*Primary Examiner* — Robert J Craddock
(74) *Attorney, Agent, or Firm* — Joseph P. Curcuru

(57) ABSTRACT

In an approach to improve virtual reality (VR) by rendering objects in a viewing area within a virtual environment as static embodiments display, by a user interface on a computing device, a plurality of captured frames of a physical surrounding area. Additionally, embodiments determine a primary focus area and a secondary focus area of the displayed plurality of captured frames using object recognition techniques and detect movement of a second object in the secondary focus area. Additionally, responsive to detecting movement of the second object in the secondary focus area, embodiments render the second object as static in the displayed plurality of captured frames.

20 Claims, 4 Drawing Sheets

(56) References Cited

OTHER PUBLICATIONS

Grover et al., "What is the maximum angle a human eye can see?—Quora", © Quora Inc. 2020, 5 pages, <https://www.quora.com/What-is-the-maximum-angle-a-human-eye-can-see>.

Lee et al., "Partitioning open-plan workspaces via augmented reality." Personal and Ubiquitous Computing, Accepted: Aug. 27, 2019, © Springer-Verlag London Ltd, part of Springer Nature 2019, 16 pages.

SELECTIVELY PAUSING PHYSICAL MOVEMENT IN A VIRTUAL ENVIRONMENT

BACKGROUND OF THE INVENTION

The present invention relates generally to the field of virtual reality, and more particularly to object movement in relation to user activity in a virtual environment.

Peripheral vision, or indirect vision, is an individual's vision as it occurs outside the point of fixation (i.e. away from the center of gaze). The vast majority of the area in the visual field is included in the notion of peripheral vision. "Far peripheral" vision refers to the area at the edges of the visual field, "mid-peripheral" vision refers to medium eccentricities, and "near-peripheral", sometimes referred to as "para-central" vision, exists adjacent to the center of gaze. Virtual reality (VR) is a simulated experience that can be similar to or completely different from the real world. Applications of virtual reality include entertainment (e.g. video games), education (e.g. medical or military training) and business (e.g. virtual meetings). Other distinct types of VR-style technology include augmented reality (AR) and mixed reality, sometimes referred to as extended reality (XR).

Currently, standard virtual reality systems use either virtual reality headsets or multi-projected environments to generate realistic images, sounds and other sensations that simulate a user's physical presence in a virtual environment. A person using virtual reality equipment is able to look around the artificial world, move around in it, and interact with virtual features or objects. The effect is commonly created by VR headsets consisting of a head-mounted display with a small screen in front of the eyes, but can also be created through specially designed rooms with multiple large screens. Virtual reality typically incorporates auditory and video feedback, but may also allow other types of sensory and force feedback through haptic technology.

SUMMARY

Embodiments of the present invention disclose a computer-implemented method, a computer program product, and a system for rendering objects in a viewing area within a virtual environment as static, the computer-implemented method comprising: displaying, by a user interface on a computing device, a plurality of captured frames of a physical surrounding area; determining a primary focus area and a secondary focus area of the displayed plurality of captured frames using object recognition techniques, wherein the primary focus area is an area where a user is interacting with a first object while performing an activity; detecting movement of a second object in the secondary focus area; and responsive to detecting movement of the second object in the secondary focus area, rendering the second object as static in the displayed plurality of captured frames.

DETAILED DESCRIPTION

Figure 1A:
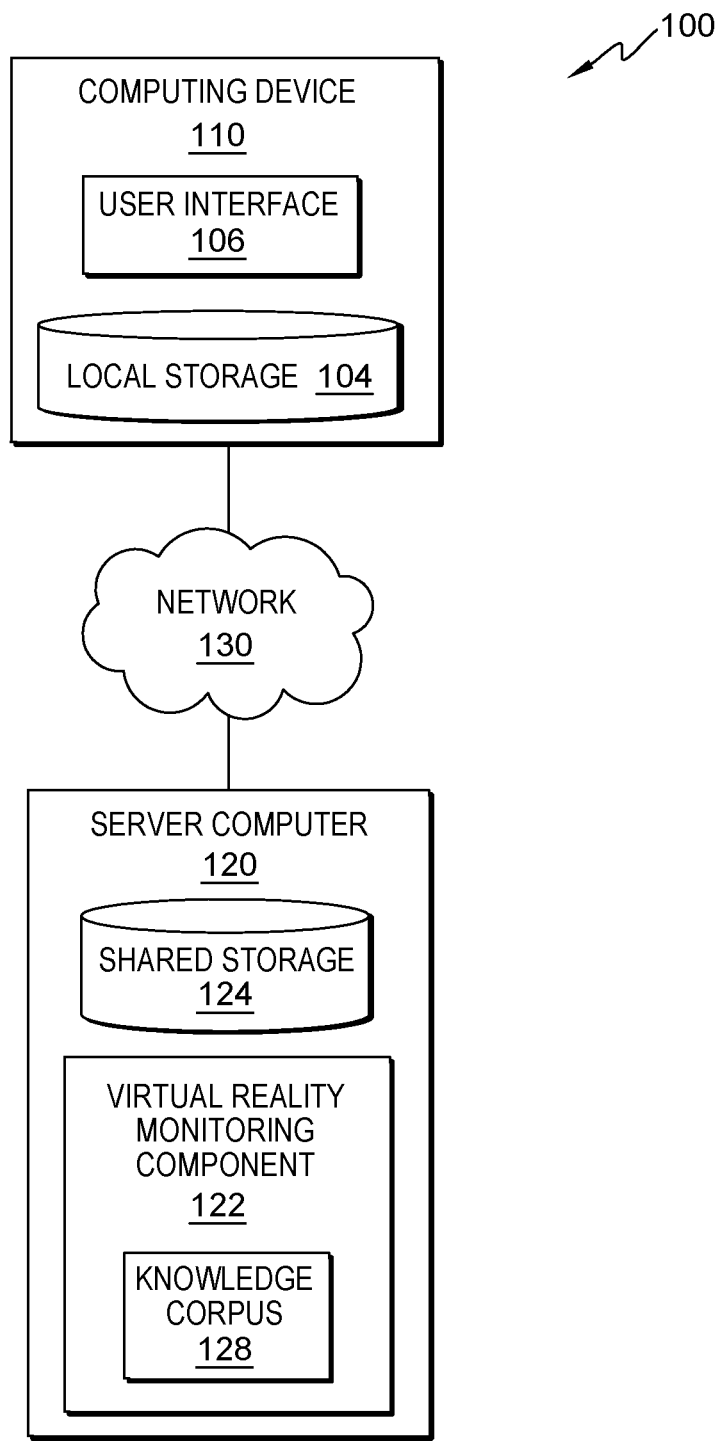
FIG. 1A is a functional block diagram illustrating a distributed data processing environment, in accordance with an embodiment of the present invention.

While focusing activity towards a particular area (i.e., target area) a user may be distracted by the movement of alternative objects (e.g., objects not intended for the user to focus on) in areas surrounding the target area. In this instant, similar to real life events where movement of physical alternative objects around the area of activity (e.g., target area) can a user lose his/her focus, movement of digital recreations of the physical objects in any display screen may also distract the user. For example, people walking by as a user interacts with an augmented reality (AR) environment. The movement of surrounding objects (e.g., alternative objects) can distract a user while the user is performing an activity in a virtual environment (e.g., virtual or augmented reality). Here the user's attention may get diverted if objects present in the surrounding are also moving while the user is performing any activity. For example, if a user's focus area (i.e., target area) is a persons standard line of sight then various objects moving near the user's focus area just outside the users and/or in the user's peripheral vision will be distracting to the user while the user performs an activity/function in the focus area.

If the movement of the surrounding objects in a virtual display are made static, and only the target area of a virtual activity can move as per the activity, then the distraction level of the user can be reduced. Embodiments of the present invention improve the art by filtering/blocking the visual movement of any physical or digital object in the surrounding that may cause distraction while a user is performing an activity. Further, embodiments of present invention improve the art by applying selective movement and pausing of one or more objects or conditional movement pausing of one or more objects present around the area of activity in a virtual environment. Embodiments of the present invention apply selective movement and pausing of one or more objects or conditional movement pausing of one or more objects present around the area of activity when a user is operating virtual reality (VR) glasses so when any physical or digital movement is detected, the VR system will display the objects in a static state, thus reducing and/or controlling a user's distraction level.

Additionally, embodiments of the present invention improve the art by (i) capturing frames of an area physically surrounding a user with two or more three dimensional (3D) cameras, wherein each 3D camera comprises two or more image sensors, and wherein the frames are captured on a real time basis, (ii) displaying the captures frames of the physical surrounding area on a virtual reality (VR) device worn by the user, thereby enabling the user to visualize the exact physical surrounding through the VR device, (iii) determining primary and secondary focus areas of the displayed frames using object recognition techniques, wherein the primary focus area is where the user is interacting with one or more first objects while performing an activity; (iv)

detecting movement of an object in the secondary focus area; and (v) responsive to detecting movement of an object in the secondary focus area, rendering the object as static (not moving).

Implementation of embodiments of the invention may take a variety of forms, and exemplary implementation details are discussed subsequently with reference to the Figures (i.e., FIG. 1A-FIG. 3).

FIG. 1A is a functional block diagram illustrating a distributed data processing environment, generally designated 100, in accordance with one embodiment of the present invention. The term "distributed" as used in this specification describes a computer system that includes multiple, physically distinct devices that operate together as a single computer system. FIG. 1A provides only an illustration of one implementation and does not imply any limitations with regard to the environments in which different embodiments may be implemented. Many modifications to the depicted environment may be made by those skilled in the art without departing from the scope of the invention as recited by the claims. Distributed data processing environment 100 includes computing device 110 and server computer 120 interconnected over network 130.

Network 130 may be, for example, a storage area network (SAN), a telecommunications network, a local area network (LAN), a wide area network (WAN), such as the Internet, a wireless technology for exchanging data over short distances (using short-wavelength ultra-high frequency (UHF) radio waves in the industrial, scientific and medical (ISM) band from 2.4 to 2.485 GHz from fixed and mobile devices, and building personal area networks (PANs) or a combination of the three), and may include wired, wireless, or fiber optic connections. Network 130 may include one or more wired and/or wireless networks that may receive and transmit data, voice, and/or video signals, including multimedia signals that include voice, data, text and/or video data. In general, network 130 may be any combination of connections and protocols that will support communications between computing device 110 and server computer 120, and any other computing devices and/or storage devices (not shown in FIG. 1A) within distributed data processing environment 100.

In some embodiments of the present invention, computing device 110 may be, but is not limited to, a standalone device, a client, a server, a laptop computer, a tablet computer, a netbook computer, a personal computer (PC), a smart phone, a desktop computer, a smart television, a smart watch, a radio, a stereo system, a cloud based service (e.g., a cognitive cloud based service), AR glasses, a virtual reality headset, any HUD known in the art, and/or any programmable electronic computing device capable of communicating with various components and devices within distributed data processing environment 100, via network 130 or any combination therein. In general, computing device 110 may be representative of any programmable computing device or a combination of programmable computing devices capable of executing machine-readable program instructions and communicating with users of other computing devices via network 130 and/or capable of executing machine-readable program instructions and communicating with server computer 120. In some embodiments computing device 110 may represent a plurality of computing devices.

In some embodiments of the present invention, computing device 110 may represent any programmable electronic computing device or combination of programmable electronic computing devices capable of executing machine readable program instructions, manipulating executable machine-readable instructions, and communicating with server computer 120 and other computing devices (not shown) within distributed data processing environment 100 via a network, such as network 130. Computing device 110 may include an instance of user interface (interface) 106, and local storage 104. In various embodiments, not depicted in FIG. 1A, computing device 110 may have a plurality of interfaces 106. In other embodiments, not depicted in FIG. 1A, distributed data processing environment 100 may comprise a plurality of computing devices, plurality of server computers, and/or one a plurality of networks. Computing device 110 may include internal and external hardware components, as depicted, and described in further detail with respect to FIG. 3.

User interface (interface) 106 provides an interface to virtual reality integration (component) 122. Computing device 110, via user interface 106, may enable a user and/or a client to interact with component 122 and/or server computer 120 in various ways, such as sending program instructions, receiving program instructions, sending and/or receiving messages, updating data, sending data, inputting data, editing data, collecting data, and/or receiving data. In one embodiment, interface 106 may be a graphical user interface (GUI) or a web user interface (WUI) and may display at least text, documents, web browser windows, user options, application interfaces, and instructions for operation. interface 106 may include data (such as graphic, text, and sound) presented to a user and control sequences the user employs to control operations. In another embodiment, interface 106 may be a mobile application software providing an interface between a user of computing device 110 and server computer 120. Mobile application software, or an "app," may be designed to run on smart phones, tablet computers and other computing devices. In an embodiment, interface 106 may enable the user of computing device 110 to at least send data, input data, edit data (annotations), collect data and/or receive data.

Server computer 120 may be a standalone computing device, a management server, a web server, a mobile computing device, one or more client servers, or any other electronic device or computing system capable of receiving, sending, and processing data. In other embodiments, server computer 120 may represent a server computing system utilizing multiple computers such as, but not limited to, a server system, such as in a cloud computing environment. In another embodiment, server computer 120 may represent a computing system utilizing clustered computers and components (e.g., database server computers, application server computers, etc.) that act as a single pool of seamless resources when accessed within distributed data processing environment 100. Server computer 120 may include internal and external hardware components, as depicted, and described in further detail with respect to FIG. 8 In some embodiments server computer 120 may represent a plurality of server computers.

Each of shared storage 124 and local storage 104 may be a data/knowledge repository and/or a database that may be written and/or read by one or a combination of component 122, server computer 120 and computing device 110. In some embodiments, each of shared storage 124 and local storage 104 may be a data/knowledge repository, a knowledge base, a knowledge center, a knowledge corpus, and/or a database that may be written and/or read by one or a combination of component 122, server computer 120 and computing device 110. In the depicted embodiment, shared storage 124 resides on server computer 120 and local storage 104 resides on computing device 110. In another embodiment, shared storage 124 and/or local storage 104 may reside elsewhere within distributed data processing environment 100, provided that each may access and is accessible by computing device 110 and server computer 120. Shared storage 124 and/or local storage 104 may each be implemented with any type of storage device capable of storing data and configuration files that may be accessed and utilized by server computer 120, such as, but not limited to, a database server, a hard disk drive, or a flash memory. In various embodiments, not depicted in FIG. 1A, in addition to shared storage 124, server computer comprises a primary and a secondary database, described below in FIG. 3. The primary database, also referred to as primary storage device, may be one or more of any type of disk storage known in the art. The secondary database, also referred to as secondary storage device, may be one or more any type of tape storage known in the art.

In the depicted embodiment, component 122 is executed on server computer 120. In other embodiments, component 122 may be executed on computing device 110. In various embodiments of the present invention, not depicted in FIG. 1A, component 122 may execute on a plurality of server computers 120 and/or on a plurality of computing devices 110. In some embodiments, component 122 may be located and/or executed anywhere within distributed data processing environment 100 as long as component 122 is connected to and/or communicates with, computing device 110, and/or server computer 120, via network 130. In the depicted embodiment, component 122 comprises knowledge corpus 128. In some embodiments, knowledge corpus 128 may be shared storage 124.

In various embodiments of the present invention, not depicted in FIG. 1A, and knowledge corpus 128 may each execute on a plurality of server computers 120 and/or on a plurality of computing devices 110. In some embodiments, and knowledge corpus 128 may each be located and/or executed anywhere within distributed data processing environment 100 as long as knowledge corpus 128 are connected to and/or communicates with, computing device 110, component 122, and/or server computer 120, via network 130. In various embodiments, component 122, via knowledge corpus 128, creates one or more virtual reality visualizations (i.e., visualization/virtual visualization) of the one or more captured images.

In various embodiments, while performing an activity in the physical world, a user can wear a VR device to visualize the exact physical surrounding and control the visualization of physical objects movement selectively. Similarly, a user may perform an activity in the physical world using an augmented reality (AR) device (e.g., computing device 110). In some embodiments, physical objects possess physical movement, but the user cannot visualize the movement of the object through the VR device. In various embodiments, component 122 receives one or more defined zones of activity in the user's "peripheral vision range", wherein the user selects one or more zones to enable physical movement and one or more zones to render movement static (i.e., selects one or more zones where the user desires the movement of one or more physical objects to not be shown through computing device 110 (e.g., VR device or AR device). Responsive to receiving the one or more defined zones of activity in the user's "peripheral vision range", component 122 implements the user's desired zones. In some embodiments, based on received user feedback (e.g., user eye focus and peripheral calibration), the defined zones are predetermined.

In various embodiments, component 122 receives selectively defined objects from a user, wherein the selectively defined objects my comprise instruction to be filtered from the user's view or depicted as static in computing device 110. For example, a user can selectively select and/or define that an oscillating fan's movement should not be shown through the VR device, so when any movement from the oscillating fan is detected in the physical world, the VR device will display the oscillating fan as standing still with no movement (i.e., masking the movement of the oscillating fan). In various embodiments, component 122 identifies moving objects in a user's field of view and determines if the identified moving objects will distract the user based on the currently monitored user eye tracking and/or historical learned user eye tracking and/or distraction events (e.g., events where an object caused the user to become distracted). In various embodiments, component 122 receives selectively identify objects to be paused from user input and creates, via generative adversarial networks (GANs), static virtual image displays of the selectively identify objects. In some embodiments, the GAN module can generate images that enable component 122 to identify which one or more objects and movement patterns of the one or more objects may be distracting to a user, and wherein the GAN module is activated to mask the moving of the one or more objects. In some embodiments, the masking of one or more identified alternative objects in a virtual environment will look like the user has paused the physical object.

In another example, a ball physically being kicked across a visual plane and area of focus may be distracting to a user performing a virtual task. During execution of an activity in a VR simulation of the real world physical event, component 122 masks the movement of the kicked ball from the user's visual plane and area of focus. In various embodiments, component 122, via computing device 110, tracks user data (e.g., a user's biometric parameter, current attention level, visual focus and patterns, eye movement, peripheral vision, distraction patterns, zone settings, previously filtered object and movement, and/or any other user biometric and visual data known in the art). Component 122 may identify, based on the tracked user data, which one or more objects to mask and display as static, to a user, in a VR device. Component 122, via computing device 110, may track the change in the contextual situation because of movement of the objects in the surrounding, wherein change is in the is particular context is distracting to the use and the VR or AR device will mask the context by masking the movement of the objects through the VR or AR screen. In various embodiments, component 122 may retrieve stored user learning data (i.e., historic user data), wherein the historic user data comprises, but is not limited to, visual focus and patterns, eye movement, peripheral vision, distraction patterns, zone settings, and/or previously filtered object and movement.

In various embodiments, component 122, not depicted in FIG. 1A, comprises one or more three-dimensional (3D) cameras, wherein the 3D cameras are installed towards a user's external surroundings. Component 122, via the one or more 3D cameras, captures the physical surroundings of a user in real time. In various embodiments, component 122 displays the captured physical surrounding through computing device 110 (i.e., component 122 visualizes the captured physical surround through one or more VR devices). In various embodiments, component 122 enables a user to visualize the exact physical surroundings of the captured physical surroundings in real time. In some embodiments, component 122 may comprise predetermined settings the delay the visualization of the captured area. In other embodiments, component 122 enables a user to visualize the exact physical surroundings of previously captured and/or stored physical surroundings.

Component 122 may enable a user to view the physical area around the user, wherein the visualization of the surrounding area comprises a user's primary focus area and a user's peripheral vision, and wherein component segments the user's primary focus area and the user's peripheral vision (e.g., enable the user to view the surroundings apart from the primary focus area. The user will have clear vision in the primary focus area as well as the surrounding area). In various embodiments, component 122 identifies the primary focus area of a user while the user is performing one or more actives through computing device 110 and identify one or more objects that the user is interacting with while performing one or more activities in the virtual environment (i.e., VR or AR environment). In various embodiments, while a user is performing one or more activities in a virtual environment, component 122 receives and/retrieves one or more defined zones from a user (i.e., user defined zones).

The user defined zones may comprise zones/areas in the peripheral vision of the user that the user desires to prohibit any movement that may cause distraction from the users focus area. In various embodiments, component 122 displays responsive prompts to the user, via computing device 110, that enable a user to selectively define zones. For example, component 122 displays one or more responsive prompts to the user that prompt the user to define one or more zones by selecting visual areas in the virtual environment and prompts that enable the confirmation and saving of the users selection. In this particular example, the user graphically selects one or more visual areas/zones (i.e., zones) where the user does not want to see any movement of the object. In various embodiments, component 122 instruction from the user to mask the movement of identified selected objects. In various embodiments, the defined objections are predetermined or received from the user through responsive prompts similar to defined zones.

In various embodiments, component 122, via computing device 110, captures user data, wherein the user data comprises, but is not limited to, visual focus and patterns, eye movement, peripheral vision, distraction patterns, zone settings, and/or selectively defined objects and movement, biometric parameters, and/or the user's current attention level. The storing and analyzation, via historical learning, of the user data convert the captured user data into historical user data. In some embodiments, component 122, via computing device 110, track a user's pattern of distraction over a predetermined amount of time and accordingly dynamically adjusting to the user's visual focus areas while the user is performing one or more activities in a virtual environment. In some embodiments, component 122, via historical learning and computing device 110, identifies which objects being displayed in a virtual environment from the physical environment may cause or are causing distractions to a user based on the captured user data and/or historical user data.

In various embodiments, component 122, via computing device 110, identifies various contextual situations of instances when a user gets distracted (i.e., user distractions). A user distraction may be an instance when the user's visual focus moves to any area away from the focus area or to an object not associated with an activity in a VR environment for a predetermined amount of time). Component 122 may collect the identified user distractions and create a knowledge corpus based on the identified user distractions. In various embodiments, component 122, via one or more cameras installed on computing device 110, track the types of movement being detected/identified in the surrounding area. Component 122, via computing device 110, may analyze the camera feed and predict one or more future movements of one or more objects in the surrounding area. Component 122 may predict the movement of one or more objects for a predetermined amount of time and/or while the user is performing an activity in a virtual environment. In various embodiments, component 122, via computing device 110 identifies if one or more objects in the surrounding area is associated with the user's activity in a virtual environment based on the user's visual focus and defined zones, wherein if an objection is outside the user's visual focus or in a defined zone then component 122 mask the movement of the object.

In various embodiments, component 122 stores, via computing device 110 or server computer 120, one or more frames of the captured image to shared storage and/or local storage 104, wherein the one or more frames of the capture image comprise a fraction of a delay in the frame display of the surrounding objects to the user. In various embodiments, component 122, via computing device 110, displays the target area in real time while simultaneously displaying other surrounding objects and/or areas in a predetermined time delay (e.g., displaying one or more objects not associated with the user activity or focus area at least a fraction of a second slower than objects associated with the user or the focus area. For example, framerate is "n", means "n" frames per second. The activity will be shown in real time, and objects or activities not associated with the user activity or focus area will be delayed by (1/n) seconds, so that the VR device will have time to validate if any movement of objects outside the user focus and/or in the defined zones is detected.

In various embodiments, component 122, via computing device 110, compares two or more subsequent frames in a video feed displayed to the user through computing device 110 to identify one or more deviations of object movement and/or user visual focus based on a defined zone, object, contextual situation. In some embodiments the video feed is live/real time or pre-recorded. If the deviation is identified between two or more subsequent frames of one or more objects and the objects are in a zone that may distract the user, then computing device 110 may not change the frame; however, for the activity area, the frames will be changed. If any movement of the surrounding objects are identified, then computing device 110 may display the moving objects as static even though there is a physical movement with the object. In various embodiments, component 122 displays, via computing device 110, a visualization of object movement for objects in a user's visual focus or where the user is performing an activity (i.e., active area) but displays distracting objects (e.g., objects outside of the user's visual focus and/or active area) as static even if the distracting objects are identified as being in motion.

In various embodiment, component 122 receives from interface 106 or retrieves from local storage 104 and/or shared storage 124 one or more user defined patterns of movement to be masked. For example, throwing and catching a ball outside near a street where cars are driving by, wherein the movement of the cars is masked by displaying pre-recorded visualization (e.g., video) of the street that contains no car movement. In another example, using a VR device, a user can select one or more objects from the VR screen and selectively pauses the surroundings. In various embodiments, the focus area of a user can be repositioned and reoriented using eye-tracking systems and devices as they are known and understood in the art. This enables component 122 to help prevent distractions in focused activities that involve more movement such as keeping one's eyes on the ball during a game.

Figure 1B:
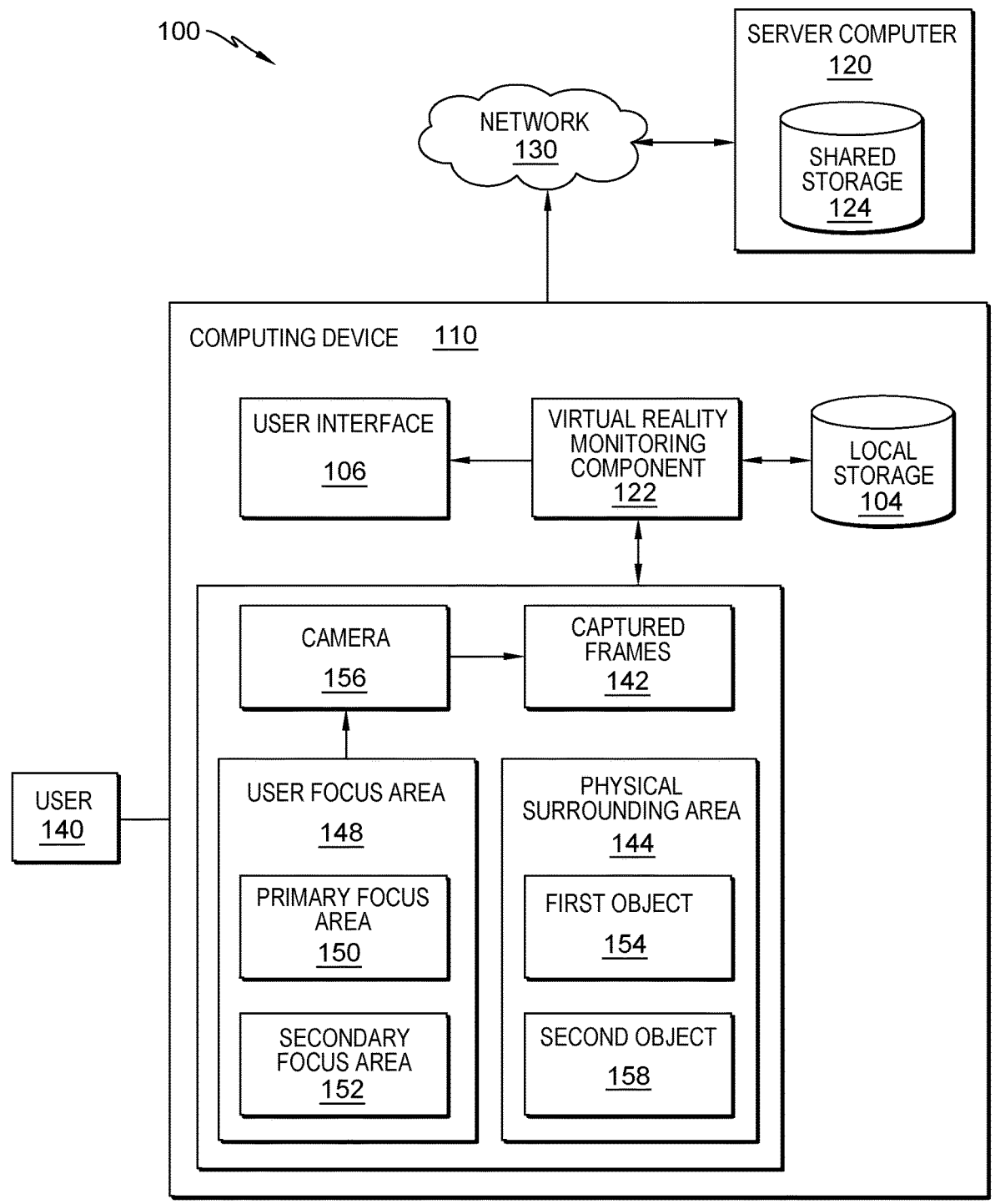
FIG. 1B is a functional block diagram illustrating a distributed data processing environment of a virtual reality monitoring component, in accordance with an embodiment of the present invention.

FIG. 1B is a functional block diagram illustrating a distributed data processing environment, generally designated 100, in accordance with one embodiment of the present invention. The term "distributed" as used in this specification describes a computer system that includes multiple, physically distinct devices that operate together as a single computer system. FIG. 1B provides only an illustration of one implementation and does not imply any limitations with regard to the environments in which different embodiments may be implemented. Many modifications to the depicted environment may be made by those skilled in the art without departing from the scope of the invention as recited by the claims. Distributed data processing environment 100 includes computing device 110, user 140, and server computer 120 interconnected over network 130.

Component 122, via camera component 156, may capture physical surrounding area (surrounding area) 144 of a user in real time and display captured frames 142 on interface 106 of a virtual reality or augmented reality device (i.e., computing device 110). Captured frames 142 may be a plurality of captured media (e.g., image frames or video frames) and camera component is any camera and/or video recording device known in the art. Additionally, component 122 may monitor, via camera component 156, user focus area 148 of user 140, wherein component 122 may identify, monitor, and capture primary focus area 150 and secondary focus area 152 of user focus area 148. Component 122 may monitor surrounding area 144 for first object 154 in primary focus area 150 and second object 158 in secondary focus area 152. Component 122, may display captured frames 142 of surrounding area 144 on interface 106 on computing device 110. Component 122 may determine primary focus area 150 and secondary focus area 152 of the displayed captured frames 142 using object recognition techniques known in the art, wherein primary focus area 150 is an area where a user is interacting with one or more first objects 154 while performing an activity. Component 122 may detect movement of one or more second objects 158 in secondary focus area 156, wherein responsive to detecting movement of the one or more second objects in the secondary focus area, component 122 may render the one or more second objects 158 as static in the displayed captured frames 142 on interface 106. In various embodiments, component 122 may store and retrieved captured frames 142 and displayed static video of captured frames 142 to and from local storage 104 and/or shared storage 124.

In various embodiments, component 122, via computing device 110, compares two or more subsequent captured frames 142 in a video feed displayed to user 140 through computing device 110 to identify one or more deviations of movement between one or more first objects 154 and/or second objects 158 and/or user visual focus 148 based on a defined: zone, object, and/or contextual situation. In some embodiments the video feed of physical surrounding area 144 to user 140 is live/real time or pre-recorded. If the deviation is identified between two or more subsequent frames of one or more first objects 154 and/or second objects 158 and the one or more first objects 154 and/or second objects 158 are in a zone that may distract the user, then computing device 110 may not change the frame; however, for the activity area, the frames will be changed. If any movement of the surrounding the one or more first objects 154 and/or second objects 158 are identified, then computing device 110 may display, via interface 106, the moving first objects 154 and/or second objects 158 as static. In various embodiments, component 122 displays, via interface 106 on computing device 110, a visualization of object movement of first objects 154 within user focus area 148 or where the user is performing an activity (i.e., active area) but displays second objects 158 (e.g., objects outside of the user's visual focus and/or active area) as static even if the distracting objects are identified as being in motion.

Figure 2:
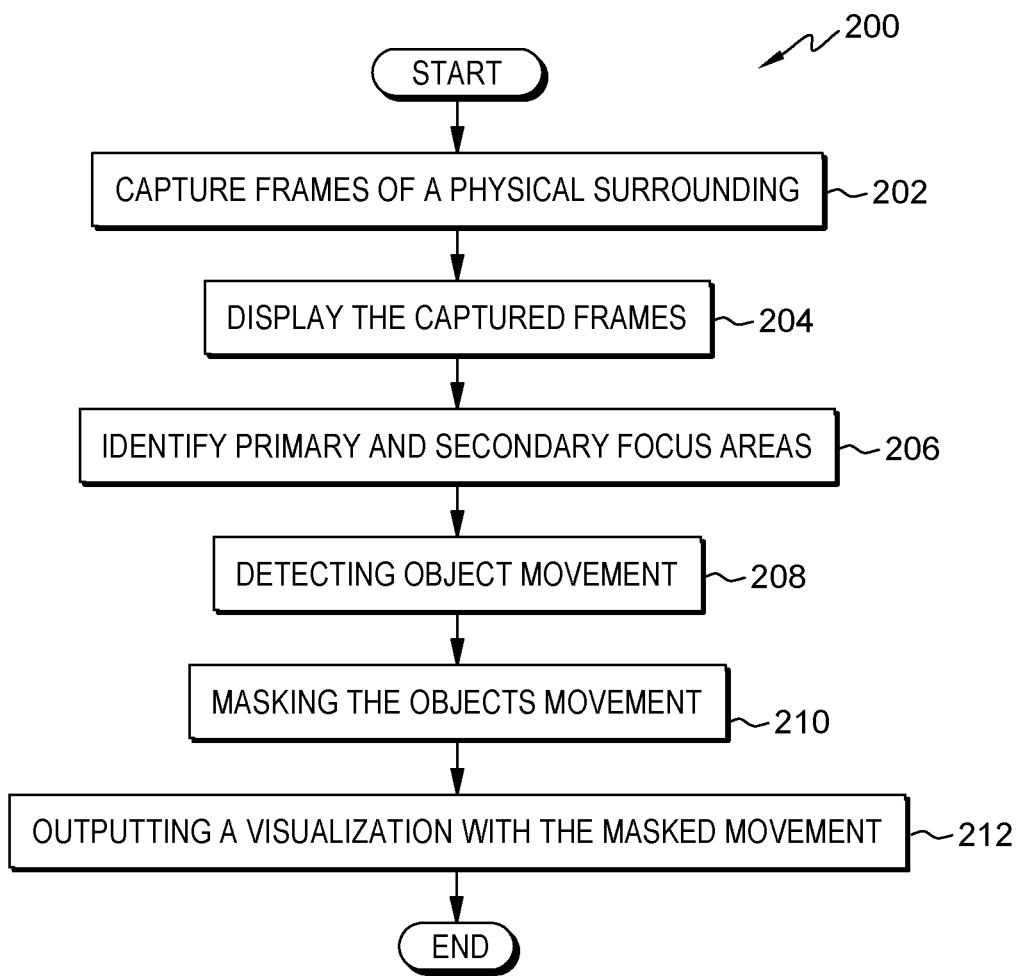
FIG. 2 illustrates operational steps of the virtual reality monitoring component, on a server computer within the distributed data processing environment of FIG. 1A and FIG. 1B, for rendering objects in a viewing area within a virtual environment as static, in accordance with an embodiment of the present invention.

FIG. 2 illustrates operational steps of component 122, generally designated 200, in communication with server computer 120, within distributed data processing environment 100 of FIG. 1A and/or FIG. 1B, for rendering objects in a peripheral viewing area as static, in accordance with an embodiment of the present invention. FIG. 2 provides an illustration of one implementation and does not imply any limitations with regard to the environments in which different embodiments may be implemented. Many modifications to the depicted environment may be made by those skilled in the art without departing from the scope of the invention as recited by the claims.

In step 202, component 122 captures frames of the physical surrounding of a user or predetermined area. In various embodiments, component 122 captures one or more frames of the physical surrounding of a user or predetermined area with two or more 3D cameras, wherein each 3D camera comprises two or more image sensors, and wherein the frames are captured in real time.

In step 204, component 122 displays the captured frames of the physical surrounding. In various embodiments, component 122 displays, via computing device 110 (e.g., VR headset or AR device), the physical surrounding of a user or predetermined area to the user, wherein the display produces a visualization to the user that mimics the exact physical surrounding in a virtual environment.

In step 206, component 122 identifies a focus area of displayed frames. In various embodiments, component 122 identifies a focus area of displayed frames using object recognition techniques, wherein the focus area comprises a primary focus area and a secondary focus areas, and wherein the primary focus area is where the user is interacting with one or more objects while performing an activity and the secondary area is the area outside of the primary focus area (e.g., a user's peripheral view).

In step 208, component 122 detects object movement. In various embodiments, component 122 detects the movement of one or more objects in the secondary focus area.

In step 210, component 122 masks the detected object's movement. In various embodiments, component 122 masks the movement of the one or more objects in the displayed virtual environment for the one or more detected objects in the secondary focus area. In various embodiments, component 122 response to detecting movement of an object in the secondary focus area, rendering the object as static In step 212, component 122 outputs a virtual visualization with the masked movement. In various embodiments, component 122 outputs a virtual visualization of the masked movement of one or more objects in the secondary focus area, wherein the movement of an object in the secondary focus area is render as static. In various embodiments, component 122 generates and outputs, via interface 106, responsive prompts that query the user to accept and/or rate the generated/output visualization, wherein responsive to receiving feedback from a user component 122 updates the output visualization based on the received user feedback and/or stores the user feedback and visualizations for future use to knowledge corpus 128.

Figure 3:
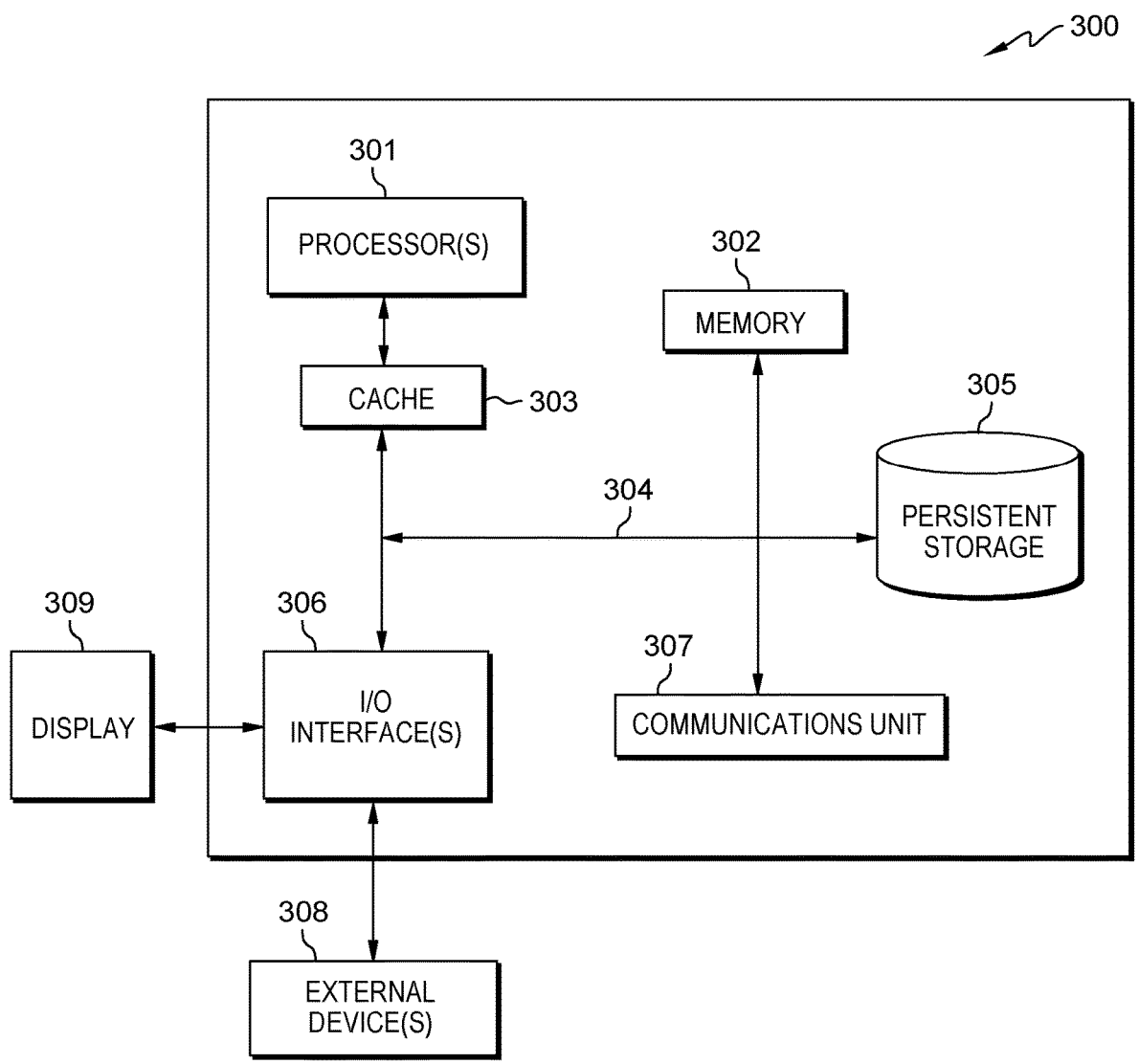
FIG. 3 depicts a block diagram of components of the server computer executing the virtual reality integration component within the distributed data processing environment of FIG. 1A and FIG. 1B, in accordance with an embodiment of the present invention.

FIG. 3 depicts a block diagram of components of server computer 120 within distributed data processing environment 100 of FIG. 1A and/or FIG. 1B, in accordance with an embodiment of the present invention. It should be appreciated that FIG. 3 provides only an illustration of one implementation and does not imply any limitations with regard to the environments in which different embodiments may be implemented. Many modifications to the depicted environment may be made.

FIG. 3 depicts computer system 300, where server computing 120 represents an example of computer system 300 that includes component 122. The computer system includes processors 301, cache 303, memory 302, persistent storage 305, communications unit 307, input/output (I/O) interface(s) 306, display 309, external device(s) 308 and communications fabric 304. Communications fabric 304 provides communications between cache 303, memory 302, persistent storage 305, communications unit 307, and input/output (I/O) interface(s) 306. Communications fabric 304 may be implemented with any architecture designed for passing data and/or control information between processors (such as microprocessors, communications, and network processors, etc.), system memory, peripheral devices, and any other hardware components within a system. For example, communications fabric 304 may be implemented with one or more buses or a crossbar switch.

Memory 302 and persistent storage 305 are computer readable storage media. In this embodiment, memory 302 includes random access memory (RAM). In general, memory 302 may include any suitable volatile or non-volatile computer readable storage media. Cache 303 is a fast memory that enhances the performance of processors 301 by holding recently accessed data, and data near recently accessed data, from memory 302.

Program instructions and data used to practice embodiments of the present invention may be stored in persistent storage 305 and in memory 302 for execution by one or more of the respective processors 301 via cache 303. In an embodiment, persistent storage 305 includes a magnetic hard disk drive. Alternatively, or in addition to a magnetic hard disk drive, persistent storage 305 may include a solid-state hard drive, a semiconductor storage device, read-only memory (ROM), erasable programmable read-only memory (EPROM), flash memory, or any other computer readable storage media that is capable of storing program instructions or digital information.

The media used by persistent storage 305 may also be removable. For example, a removable hard drive may be used for persistent storage 305. Other examples include optical and magnetic disks, thumb drives, and smart cards that are inserted into a drive for transfer onto another computer readable storage medium that is also part of persistent storage 305.

Communications unit 307, in these examples, provides for communications with other data processing systems or devices. In these examples, communications unit 307 includes one or more network interface cards. Communications unit 307 may provide communications through the use of either or both physical and wireless communications links. Program instructions and data used to practice embodiments of the present invention may be downloaded to persistent storage 305 through communications unit 307.

I/O interface(s) 306 enables for input and output of data with other devices that may be connected to each computer system. For example, I/O interface 306 may provide a connection to external devices 308 such as a keyboard, keypad, a touch screen, and/or some other suitable input device. External devices 308 may also include portable computer readable storage media such as, for example, thumb drives, portable optical or magnetic disks, and memory cards. Software and data used to practice embodiments of the present invention may be stored on such portable computer readable storage media and may be loaded onto persistent storage 305 via I/O interface(s) 306. I/O interface(s) 306 also connect to display 309.

Display 309 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium may be any tangible device that may retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein may be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, may be implemented by computer readable program instructions.

These computer readable program instructions may be provided to a processor of a general-purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that may direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures (i.e., FIG.) illustrate the architecture, functionality, and operation of possible implementations of systems, methods, and computer program products according to various embodiments of the present invention. In this regard, each block in the flowchart or block diagrams may represent a module, a segment, or a portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, may be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method for rendering objects in a viewing area within a virtual environment as static, the computer-implemented method comprising:
    displaying, by a user interface on a computing device, a plurality of captured frames of a physical surrounding area;
    determining a primary focus area and a secondary focus area of the displayed plurality of captured frames using object recognition techniques, wherein the primary focus area is an area where a user is interacting with a first object while performing an activity;
    detecting movement of a second object in the secondary focus area; and
    responsive to detecting movement of the second object in the secondary focus area, rendering the second object as static in the displayed plurality of captured frames.

2. The computer-implemented method of claim 1, further comprising:
    capturing, by a camera, frames of an area physically surrounding the user, wherein the frames are captured on a real time basis.

3. The computer-implemented method of claim 1, wherein the display produces a visualization to the user that mimics an exact physical surrounding in a virtual environment.

4. The computer-implemented method of claim 1, further comprising:
    outputting, by the computing device, a virtual visualization of the physical surrounding were the movement of the second object in the secondary focus area are masked to the user.

5. The computer-implemented method of claim 1, further comprising:
    determining the movement of the second object will be distracting to the user by identifying a deviation of movement in the second object and user visual focus, wherein identifying the deviation comprises:
        comparing two or more subsequent frames in a video feed displayed to the user through the computing device based on a defined zone, a defined object, and a defined contextual situation.

6. The computer-implemented method of claim 1, further comprising:
displaying one or more responsive prompts to the user, via the computing device, that enable the user to selectively define zones.

7. The computer-implemented method of claim 1, further comprising:
receiving a defined zone from a user, wherein the user defined zones may comprise zone areas in a peripheral field of view of the user that the user requests to restrict movement that may cause a distraction from the primary focus area.

8. A computer system for rendering objects in a viewing area within a virtual environment as static, the computer system comprising:
one or more computer processors;
one or more computer readable storage devices;
program instructions stored on the one or more computer readable storage devices for execution by at least one of the one or more computer processors, the stored program instructions comprising:
program instructions to display, by a user interface on a computing device, a plurality of captured frames of a physical surrounding area;
program instructions to determine a primary focus area and a secondary focus area of the displayed plurality of captured frames using object recognition techniques, wherein the primary focus area is an area where a user is interacting with a first object while performing an activity;
program instructions to detect movement of a second object in the secondary focus area; and
responsive to detecting movement of the second object in the secondary focus area, program instructions to render the second object as static in the displayed plurality of captured frames.

9. The computer system of claim 8, further comprising:
program instructions to capture, by a camera, frames of an area physically surrounding the user, wherein the frames are captured on a real time basis.

10. The computer system of claim 8, wherein the display produces a visualization to the user that mimics an exact physical surrounding in a virtual environment.

11. The computer system of claim 8, further comprising:
program instructions to output, by the computing device, a virtual visualization of the physical surrounding were the movement of the second object in the secondary focus area are masked to the user.

12. The computer system of claim 8, further comprising:
program instructions to determine the movement of the second object will be distracting to the user by identifying a deviation of movement in the second object and user visual focus, wherein identifying the deviation comprises:
program instructions to compare two or more subsequent frames in a video feed displayed to the user through the computing device based on a defined zone, a defined object, and a defined contextual situation.

13. The computer system of claim 8, further comprising:
program instructions to display one or more responsive prompts to the user, via the computing device, that enable the user to selectively define zones.

14. The computer system of claim 8, further comprising:
program instructions to receive a defined zone from a user, wherein the user defined zones may comprise zone areas in a peripheral field of view of the user that the user requests to restrict movement that may cause a distraction from the primary focus area.

15. A computer program product for rendering objects in a viewing area within a virtual environment as static, the computer program product comprising:
one or more computer readable storage devices and program instructions stored on the one or more computer readable storage devices, the stored program instructions comprising:
program instructions to display, by a user interface on a computing device, a plurality of captured frames of a physical surrounding area;
program instructions to determine a primary focus area and a secondary focus area of the displayed plurality of captured frames using object recognition techniques, wherein the primary focus area is an area where a user is interacting with a first object while performing an activity;
program instructions to detect movement of a second object in the secondary focus area; and
responsive to detecting movement of the second object in the secondary focus area, program instructions to render the second object as static in the displayed plurality of captured frames.

16. The computer program product of claim 15, further comprising:
program instructions to capture, by a camera, frames of an area physically surrounding the user, wherein the frames are captured on a real time basis.

17. The computer program product of claim 15, further comprising:
program instructions to output, by the computing device, a virtual visualization of the physical surrounding were the movement of the second object in the secondary focus area are masked to the user.

18. The computer program product of claim 15, further comprising:
program instructions to determine the movement of the second object will be distracting to the user by identifying a deviation of movement in the second object and user visual focus, wherein identifying the deviation comprises:
program instructions to compare two or more subsequent frames in a video feed displayed to the user through the computing device based on a defined zone, a defined object, and a defined contextual situation.

19. The computer program product of claim 15, further comprising:
program instructions to display one or more responsive prompts to the user, via the computing device, that enable the user to selectively define zones.

20. The computer program product of claim 15, further comprising:
program instructions to receive a defined zone from a user, wherein the user defined zones may comprise zone areas in a peripheral field of view of the user that the user requests to restrict movement that may cause a distraction from the primary focus area.

* * * * *